(12) United States Patent
Guo

(10) Patent No.: US 7,870,588 B2
(45) Date of Patent: Jan. 11, 2011

(54) COMMUNICATION SYSTEM INCORPORATING MOBILE COMMUNICATION NETWORK AND VIDEO BROADCAST NETWORK AND METHOD OF SAME

(75) Inventor: Zihua Guo, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 412 days.

(21) Appl. No.: 11/771,406

(22) Filed: Jun. 29, 2007

(65) Prior Publication Data
US 2008/0125131 A1  May 29, 2008

(30) Foreign Application Priority Data
Jun. 30, 2006  (CN) .................... 2006 1 0095990

(51) Int. Cl.
*H04Q 7/20* (2006.01)
(52) U.S. Cl. .................... 725/62; 370/280; 370/331; 370/330; 370/343; 370/348; 370/327; 370/328; 370/336; 370/337; 370/347; 455/446
(58) Field of Classification Search ............... None
See application file for complete search history.

(56) References Cited

U.S. PATENT DOCUMENTS
6,484,017 B1 * 11/2002 Kim .................... 455/126
6,657,982 B1 * 12/2003 Fong et al. .................... 370/336
2005/0243745 A1 * 11/2005 Stanwood et al. ........... 370/280
2006/0203950 A1 * 9/2006 Chung et al. ................ 375/376
2007/0253375 A1 * 11/2007 Hamilton et al. ............ 370/336

* cited by examiner

*Primary Examiner*—Andrew Y Koenig
*Assistant Examiner*—Rong Le
(74) *Attorney, Agent, or Firm*—Dickstein Shapiro LLP

(57) ABSTRACT

This invention discloses a communication system incorporating a video broadcast network and a mobile communication network in which a plurality of base stations constitutes at least one cell cluster, said communication system comprising: a central control node which allocates time slots for broadcast video data to a broadcast transmission tower based on a predetermined schedule algorithm and allocates time slots and/or frequency for communication to said base stations; a plurality of base stations each of which communicates with terminals within the time slots for communication allocated by the central control node and at a predetermined frequency or the frequency allocated by the central control node; and a broadcast transmission tower which transmits signals to said terminals within the time slots for broadcast video data allocated by the central control node.

14 Claims, 7 Drawing Sheets

---

100 — the resource schedule unit in the central control node allocates time slots and/or frequency to the respective cellular base stations as well as time slots to the broadcast transmission tower, and then notifies the cellular base stations of the time slots and/or frequency information allocated to it and notifies the resource notification unit of the time slot information allocated to the broadcast transmission tower 102 — the resource notification unit notifies the resource control units in the corresponding cellular base stations of the time slots and/or frequency information allocated to each of the cellular base stations, and notifies the time resource control unit in the broadcast transmission tower of the time slot information allocated to the broadcast transmission tower 104 — during the time slot notified from resource notification unit, the time resource control unit in the broadcast transmission tower controls the respective units to transmit the video broadcast signals to the terminals, while the resource control unit in each of the cellular base stations, during the time slot notified from resource notification unit, controls the respective units to transmit and receive the signals to and from the terminals at the predetermined frequency or the frequency allocated by the central node

| Video broadcast (N channels) | Cellular base station 1 (Frequency 1) | Reserved, Control packet |
|---|---|---|
| | Cellular base station 2 (Frequency 2) | |
| | Cellular base station 3 (Frequency 3) | |
| | Cellular base station 4 (Frequency 4) | |
| | Cellular base station 5 (Frequency 5) | |
| | Cellular base station 6 (Frequency 6) | |
| | Cellular base station 7 (Frequency 7) | |

Fig. 5

Cell cluster 1

| Video broadcast (N channels) | Cellular base station 1 | Cellular base station 2 | Cellular base station 3 | Reserved, Control packet |
|---|---|---|---|---|
| | Cellular base station 4 | | Cellular base station 5 | |
| | Cellular base station 6 | | Cellular base station 7 | |

⋮

Cell cluster N

| Video broadcast (N channels) | Cellular base station 1 | Cellular base station 2 | Cellular base station 3 | Reserved, Control packet |
|---|---|---|---|---|
| | Cellular base station 4 | | Cellular base station 5 | |
| | Cellular base station 6 | | Cellular base station 7 | |

Fig. 6

COMMUNICATION SYSTEM INCORPORATING MOBILE COMMUNICATION NETWORK AND VIDEO BROADCAST NETWORK AND METHOD OF SAME

BACKGROUND OF THE INVENTION

1. Field of Invention

The present invention relates to a communication system and communication method, in particular, to a communication system incorporating mobile communication network and video broadcast network as well as the communication method thereof.

2. Description of Prior Art

As the rise of the demand for mobile audio and video, mobile video broadcast service has increased in the market of mobile communication. Especially, as the wideband wireless technology developed rapidly, more and more discussion is directed to how to incorporate the conventional mobile communication network, wireless Internet data network and broadcast network in the next generation of wireless network.

The conventional mobile communication network uses a cellular structure. Such cellular structure performs communication in the manner of frequency division multiplexing (FDM) and generally supports only voice and data unicast services. FIG. 1 shows a conventional cellular architecture. As shown in FIG. 1, generally, network operators carries out networking with seven cellular architecture. That is, one cell together with six neighbor cells constitutes one cell cluster. The resultant frequency spectrum resource, for example, 14 MHz, is allocated to each of the cellular base stations respectively, which is in turn allocated with a fixed frequency band of 2 MHz. This frequency spectrum resource is repeatedly allocated among all cell clusters in a 2-dimension fashion since the cellular base stations in two neighbor cell clusters are far enough from each other to multiplex the same 2 MHz frequency band. With such cellular structure, each of the cellular base stations uses a frequency band which does not interfere with those of the other stations. Therefore, the cellular base stations in all cell clusters may operate simultaneously. Each of the cell clusters shown as in FIG. 1 contains seven cellular base stations. It will be understood that each cell cluster can also contains three or four cellular base stations. Further, any other number of cellular base stations can also be provided according to network design.

At present, however, the mobile communication network has not substantially incorporated with the video broadcast network, and the two networks are operated independently of each other. Even video content can be received over some mobile communication networks, the video stream is only treated as common data and transferred from a cellular base station to terminals for display. Therefore, the efficiency for broadcasting video programs over current cellular networks is low. Moreover, the mobile communication networks have the following problems.

1. The allocation of the frequency spectrum is fixed, so it is impossible sufficiently to use the frequency spectrum resource, thereby resulting in a waste of frequency spectrum. For example, a cellular base station 1 uses the same frequency spectrum resource as that of a cellular base station 3, whereas the number of users communicating through the base station 1 may actually smaller than the number of users communicating through the base station 3. Although the area of a cell can be dynamically increased or decreased by a method called "Cell Breathing" so as to alleviate the waste of the frequency spectrum, this method greatly complicates the overall system due to, for example, user switching and resource allocation. Further, with the method of "Cell Breathing", it is required to change the transmitting power of the base stations to obtain a larger coverage area when the area of the relevant cell is dynamically expanded.

2. The conventional network architecture requires a complex planning for the frequency spectrum since every cell needs to be allocated with certain frequency spectrum resource.

As for video broadcast network, the conventional video broadcast transmission towers provide only analog video broadcast service. Even if a few of broadcast transmission are capable of providing digital video broadcast service, they are each networked individually without combining with any mobile communication network.

SUMMARY OF THE INVENTION

The object of the present invention is to provide a communication system incorporating mobile communication network and video broadcast network and a communication method thereof, which is capable of incorporating the mobile communication network and the video broadcast network together and providing effective video broadcast service while fulfilling mobile communication service.

According to one aspect of the present invention, there is provided a communication system incorporating video broadcast network and mobile communication network in which a plurality of base stations constitutes at least one cell cluster, said communication system comprises a central control node which allocates time slot for broadcasting video data to a broadcast transmission tower based on a predetermined schedule algorithm and allocates time slot and/or frequency for communication to said base stations; base stations each of which communicates with terminals within the time slot allocated for communication by the central control node and at a predetermined frequency or the frequency allocated by the central control node; and a broadcast transmission tower which sends video data to the terminals within the time slot allocated for broadcasting the video data by the central control node.

According to another aspect of the present invention, there is provided a method for performing video data broadcast and data communication in a communication system incorporating video broadcast network and mobile communication network in which a plurality of base stations constitute at least one cell cluster, and said method comprising the steps of: a central control node allocates time slot for broadcasting video data to a broadcast transmission tower based on a predetermined schedule algorithm and allocates time slot and/or frequency for communicating with terminals to said base stations; the time slot allocated to the broadcast transmission tower is notified to the broadcast transmission tower, and the time slot and/or frequency allocated to each of the base stations is notified to the corresponding base stations; the broadcast transmission tower sends video data to said terminals within the allocated time slot for sending the broadcast video data, and each of the base stations communicates with the terminals within the time slot allocated for communicating with the terminals and at a predetermined frequency or the frequency allocated by the central control node.

According to the present invention, it is possible for the communication system incorporating the mobile communication network and the video broadcast network to provide high efficient video broadcast service while satisfying the data communication service. Since the time resource is allocated as desired between the mobile communication network and the video broadcast network, the usage of frequency spectrum is in high efficient. Further, Each of the base stations in the cell cluster performs communication in time division multiplexing (TDM) and/or frequency division multiplexing (FDM) manner, the frequency spectrum resource can be further efficiently used. The central control node allocates time slots to each cellular base station based on the current flow of upstream and downstream as well as the number of users for the base station, so it is not necessary for the cellular base stations to perform complex control, such as cell breathing and the like. In addition, the terminals and the cellular base stations may significantly save the power thereof by making them stay at a sleeping state during the time slot not belonging to them.

BRIEF DESCRIPTION OF THE DRAWINGS

The above objects, advantages and features of the present invention will be apparent from the following detailed description on the preferred embodiments taken conjunction with the drawings in which:

FIG. 5 is a schematic diagram showing an example of allocating resource in frequency and time domains to the cellular base stations and the broadcast transmission tower in the present invention;

FIG. 6 is a schematic diagram showing another example of allocating resource in frequency and time domains to the cellular base stations and the broadcast transmission tower in the present invention;

DETAILED DESCRIPTION OF PREFERRED EMBODIMENTS

Hereafter the embodiments of the present invention will be described in detail with reference to the figures, and details and functions unnecessary for the invention is omitted in the description in order not to obscure understanding of the invention. According to an embodiment of the present invention, there is provided a communication system incorporating mobile communication network and video broadcast network and the communication method thereof.

Figure 1:
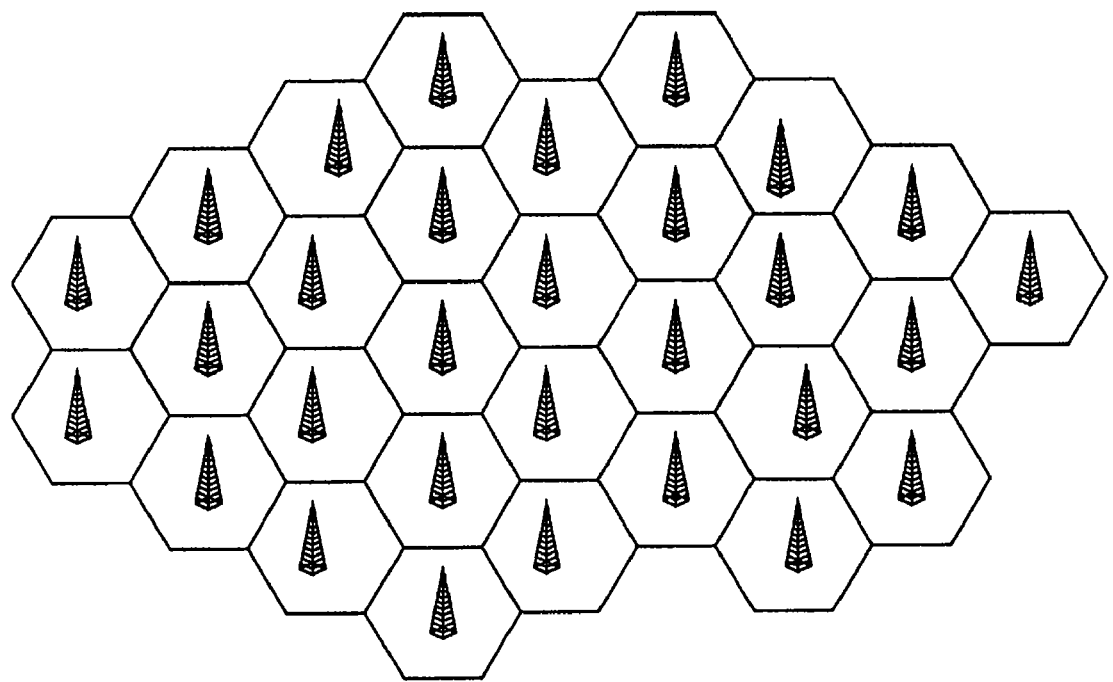
FIG. 1 is a schematic diagram showing the cellular architecture of mobile communication network used in the prior art.
Figure 2:
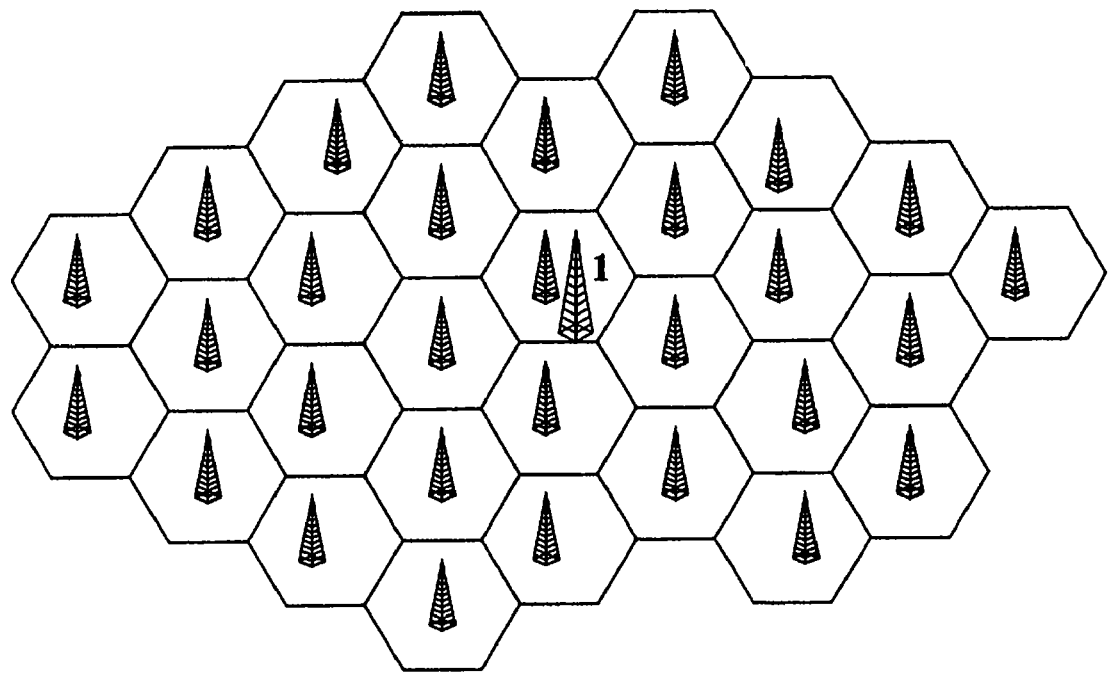
FIG. 2 is a schematic diagram showing a communication system incorporating mobile communication network and video broadcast network according to an embodiment of the present invention.

FIG. 2 is a schematic diagram showing the communication system incorporating mobile communication network and video broadcast network according to the embodiment of the present invention. As shown in FIG. 2, the communication system has a hierarchical coverage architecture including a broadcast transmission tower 1 and cell clusters covered by the tower 1.

The broadcast transmission tower 1 can transmit video broadcast data to a large range covered by the broadcast transmission tower 1. In general, only one or a few broadcast transmission towers are needed to achieve an effective coverage with a very wide range, such as a city. On the other hand, the mobile communication network is composed of cell clusters, each of which often contains 7 cellular base stations. The cellular base stations can each communicate with a plurality of mobile terminals within the covered range in a mobile manner. Although 7 cellular base stations are contained in one cell cluster as shown in FIG. 2, it will be understood this invention is not limited thereto. Each cell cluster can also contain 3 or 4 cellular base stations or any other number of cellular base stations.

Figure 3:
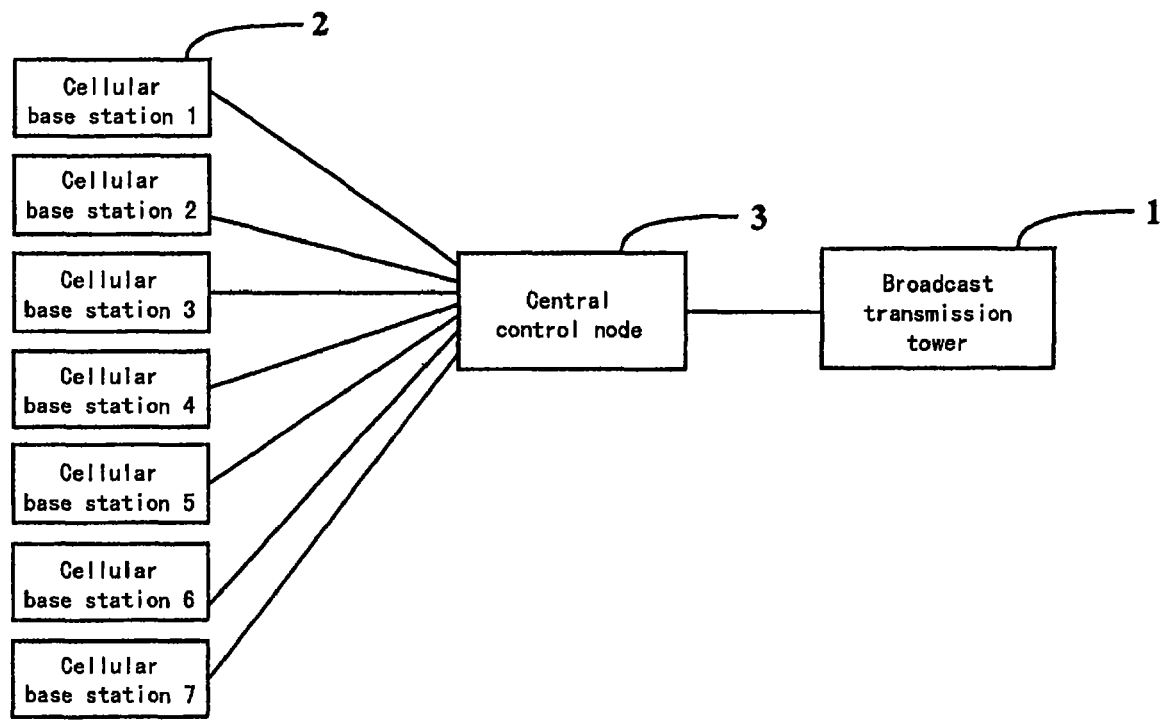
FIG. 3 is a schematic diagram showing the relationship between cell clusters, a broadcast transmission tower and a central control node according to the embodiment of the present invention.

In the embodiment, in order to incorporate the video broadcast network and the mobile communication networks, the communication system further includes a central control node 3, as shown in FIG. 3. Each of the cellular base stations 2 in a cell cluster is connected to the central control node 3 in a wired or wireless manner and allocated with associated resource, such as time slot, frequency and the like, by the central control node 3 according to a predetermined schedule algorithm. Herein, the frequency comprises frequency point in a conventional single carrier system or subband in a multi-carrier system. Meanwhile, the broadcast transmission tower 1 is also connected to the central control node 3 in a wired or wireless manned and allocated with associated resource, such as time slot, by the central control node 3.

Figure 4:
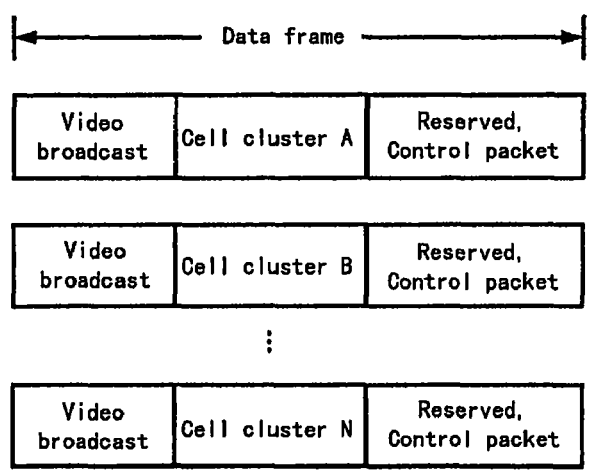
FIG. 4 is a schematic diagram showing that each cell cluster and the broadcast transmission tower share the time of a frame according to the embodiment of the present invention.

FIG. 4 is a schematic diagram showing each cell cluster sharing the time of a frame with the broadcast transmission tower according to the embodiment. As shown in FIG. 4, the broadcast transmission tower 1 and each of the cell clusters covered by the tower 1 communicate with mobile terminals in a time division multiplex (TDM) manner, respectively. That is, the video broadcast data transmitted by the broadcast transmission tower 1 and the mobile communication data transmitted by each cell cluster occupy their corresponding time slots respectively in the entire frame of a data frame. In addition, a frame contains a common time slot referred to as a control packet time slot. Some signalings can be transmitted within the control packet time slot. For example, each cellular base station 2 can obtain the resource information, such as information on time slot, frequency and the like, transmitted by the central control node 3 in the control packet time slot. Furthermore, other control functions and the like can also be fulfilled within this control packet time slot. A reserved time slot can be further included in a frame for any service expansion in future. Although the time slot for the broadcast transmission tower is arranged at the beginning of a data frame as shown in FIG. 4, it should be appreciated that such arrangement is merely for illustrative explanation, and the position where the broadcast data has no essential effect on the present invention.

In a cell cluster, the frequency resource of the cluster can be divided into multiple groups each of which has a certain range of frequency. Further, the cellular base stations are grouped accordingly such that the cellular base stations in the same group share one frequency band and are separated from each other in time domain.

As shown in FIG. 5, in each cell cluster, each of the cellular base stations can operate at the predetermined frequency and use the whole time slot allocated by the central control node to the cell cluster in which the stations exist. That is, in FIG. 5, each of the cellular base stations is allocated with corresponding frequency resource based on the number of the stations in the cell cluster and uses the entire time slot allocated to the cell cluster.

Moreover, as shown in FIG. 6, several cellular base stations can be placed into a group, and each group takes up one frequency band. Each of the cellular base stations in a group uses a part of the entire time slot for the cell cluster, i.e., the entire time slot for the cell cluster is utilized in a time division multiplex manner.

For a cell cluster, the resource such as time slot, frequency and the like can be allocated by the two manners given below.
1. Each cellular base station operates at a fixed frequency and is allocated with corresponding time slot by the central control node;
2. The central control node allocates to each cellular base station its corresponding frequency and time slot at the same time, and each cellular base station operates at the allocated frequency within the time slot allocated by the central control node.

The allocation of resource such as time slot and frequency is not limited to the two manner as described above. The central control node can adopt various manners, such as fixed allocation, request-based allocation, etc., during allocating the time slot and/or frequency to the cellular base stations as long as there is no interference among these base stations.

As mentioned in the embodiment, the central control node can allocate corresponding resource including time slot and frequency to the broadcast transmission tower and the cell clusters covered by the tower by connecting the tower and the cell clusters to the central control node. Therefore, while the data transmissions for the broadcast transmission tower and the cell clusters are separated from each other in the time domain (TDM), the cellular base stations within each cell cluster are correspondingly separated in the frequency and/or time domain. This enables the realization of incorporation between the broadcast transmission tower and the mobile communication network.

The above explains the outline of communication system incorporating mobile communication network and video broadcast network and the communication method thereof according to the embodiment. Below a detail description will be given to the communication system of the present embodiment.

Figure 7:
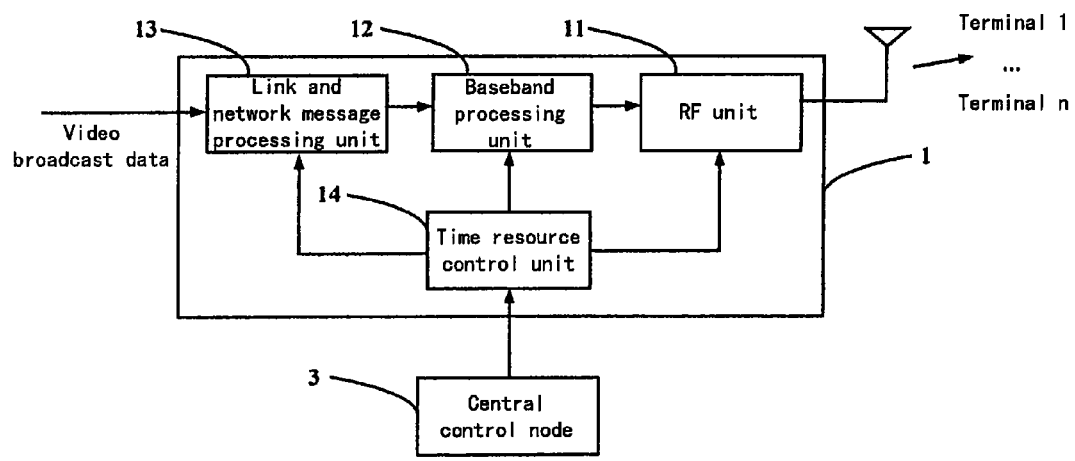
FIG. 7 is a schematic diagram showing the structure of the broadcast transmission tower according to the embodiment of the present invention.

FIG. 7 is a schematic diagram showing the structure of the broadcast transmission tower in the communication system incorporating mobile communication network and video broadcast network according to the embodiment. As shown in FIG. 7, the broadcast transmission tower 1 comprises at least a radio frequency (RF) unit 11, a baseband processing unit 12, a link and network message processing unit 13 and a time resource control unit 14.

In the broadcast transmission tower, the RF unit 11 converts digital signals into wireless RF signals to be transmitted to the terminals in networks. The baseband processing unit 12 performs baseband signal processing on the data packets to be transmitted to the terminals. The link and network message processing unit 13 controls the message transmission in accordance with known link protocol and packetizes the message. The time resource control unit 14 receives the time slot information allocated by the central control node 3 and, during the time slot information allocated by the central control node, controls the RF unit 11, the baseband processing unit 12 and the link and network message unit 13 to transmit the video broadcast signals to the terminals.

Specifically, in the time slot received by the time resource control unit 14 and allocated by the central control node 3, the video broadcast data first inputs the link and network message processing unit 13 to be packetized. The packetized packets are then supplied to the baseband processing unit 12, which in turn processes the packets to generate corresponding baseband signals. Finally, the RF unit 11 up-converts the baseband signals and then transmits them to the terminals.

As understanding based on the above description, one of the critical features of the broadcast transmission tower in the present embodiment is that it includes the time resource control unit 14, which controls the respective units in the broadcast transmission tower to transmit signals to the terminals within the allocated time slot according to the time slot information from the central control node 3 and helps to achieve the time division multiplexing between the tower and the cell clusters.

Figure 8:
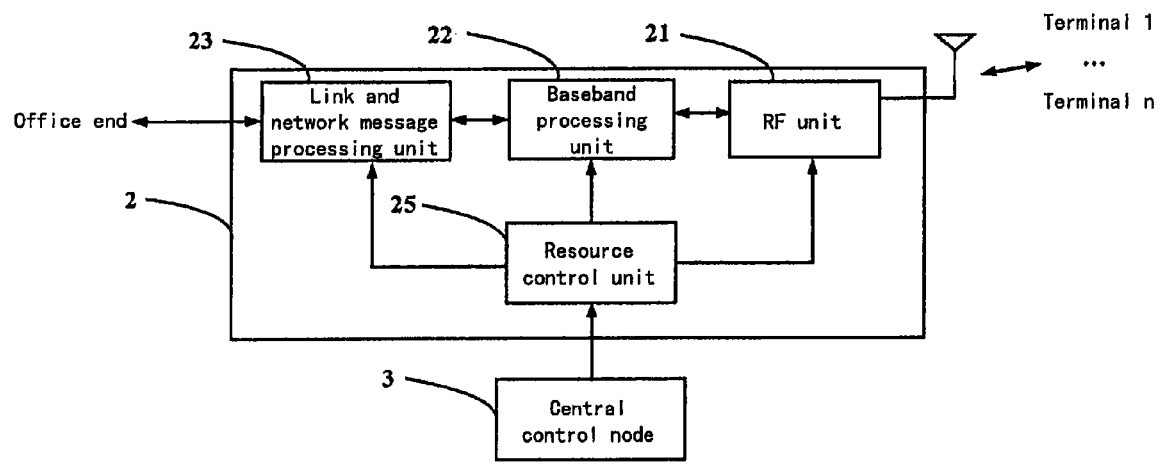
FIG. 8 is a schematic diagram showing a structural example of the cellular base station according to the embodiment of the present invention.

FIG. 8 is a schematic diagram showing the structure of a cellular base station in the communication system incorporating mobile communication network and video broadcast network according to the present embodiment. As shown in FIG. 8, the cellular base station comprises at least a radio frequency (RF) unit 21, a baseband processing unit 22, a link and network message processing unit 23 and a resource control unit 25.

The RF unit 21 converts the signals to be sent to the terminals into wireless RF signals or converts the received wireless RF signals from the terminals into baseband signals. The baseband processing unit 22 encodes and modulates the data packets to be sent to the terminals, or decodes and demodulates the data packets received from the terminals. The link and network message processing unit 23 controls the message transmission in accordance with known link protocol and packetize the message. The resource control unit 25 receives the resource information (time slot and/or frequency) allocated by the central control node 3 and, during the time slot allocated by the central control node 3, controls the respective units such that the signals can be transmitted to the terminals at the frequency allocated by the central control node and/or the predetermined frequency as well as received from the terminals.

Specifically, during the time slot allocated by the central control node 3, the signals sent by the terminal are first converted into baseband signals by the RF unit 21 (which operates at the frequency allocated by the central control node and/or the predetermined frequency). Thereafter, the received signals are decoded and demodulated by the baseband processing unit 22. The link and network message processing unit 23 checks and unpacks the decoded and demodulated signals and then sends the resultant signals to the office end. On the other hand, under the control of the resource control unit 25, the message transmitted from the office end is packetized by the link and network message processing unit 23 into data packets, which are encoded and modulated by the baseband processing unit 22 and then converted by the RF unit 21 into wireless RF signals to be transmitted to the terminals.

The cellular base station in this embodiment includes the resource control unit 25. With the resource control unit 25 receiving the resource information allocated by the central control node 3, the signals can be transmitted to the terminal within the allocated time slot at the frequency allocated by the central control node and/or the predetermined frequency as well as received from the terminal. In this way, the time division multiplexing and frequency division multiplexing can be realized between cellular base stations.

Figure 9:
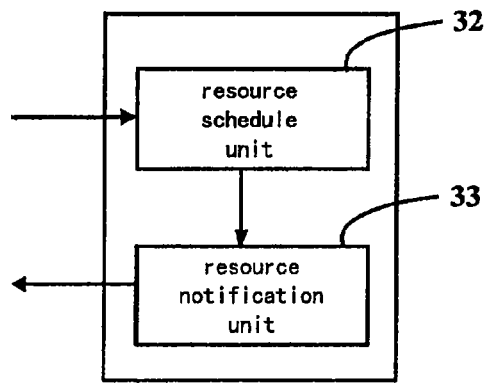
FIG. 9 is a schematic diagram showing the structure of the central control node according to the embodiment of the present invention.

FIG. 9 is a block diagram showing the central control node in the communication system incorporating mobile communication network and video broadcast network according to the present embodiment. As shown in FIG. 9, the central control node 3 includes a resource schedule unit 32 and a resource notification unit 33.

In the central control node 3, the resource schedule unit 32 allocates time slots and frequency to the cellular base stations 2, and allocates time slots to the broadcast transmission tower 1 in accordance with a predetermined schedule algorithm. Here, the resource notification unit 33 notifies the broadcast transmission tower 1 of the time slot information allocated to it and also notifies each cellular base station of the time slot and/or frequency information allocated to it.

The central control node 3 can be a device independent of all the cellular base stations and the broadcast transmission tower 1. The present invention is not limited thereto, however, the central control node 3 can be one of the processing units in the broadcast transmission tower or one of the processing units in some cellular base station.

Figure 10:
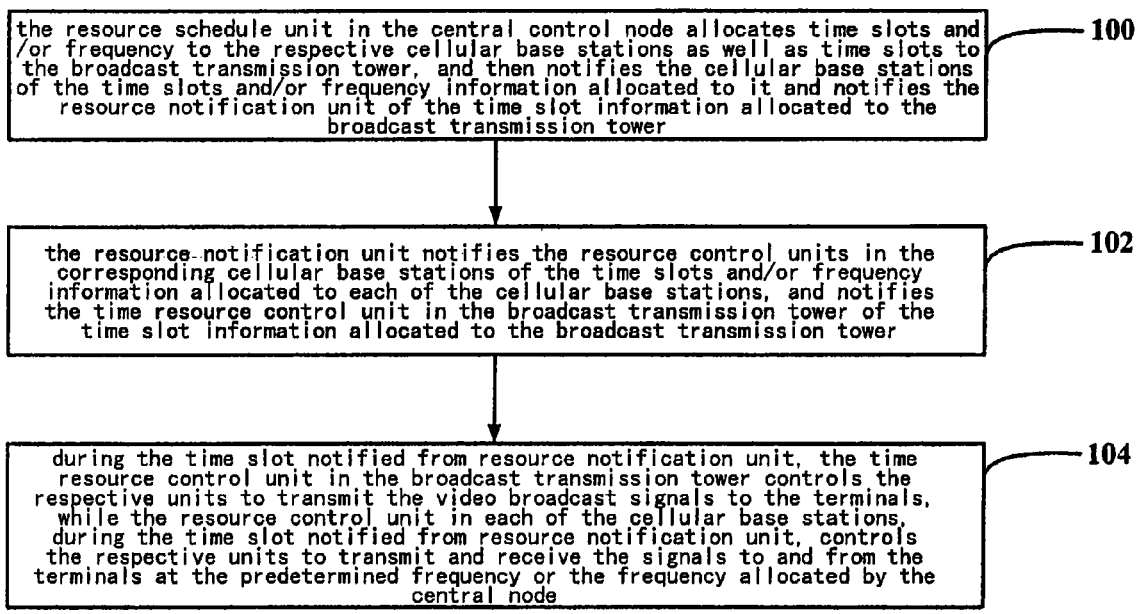
FIG. 10 is a flowchart of the communication method for the communication system incorporating mobile communication network and video broadcast network according to the embodiment of the present invention.

Next, the flow of the communication method for the communication system incorporating mobile communication network and video broadcast network of the present embodiment in the case of the broadcast transmission tower, the cellular base stations and the central control node are employed will be described with reference to FIG. 10.

At step 100, the resource schedule unit 32 in the central control node 3 allocates time slots and/or frequency to the respective cellular base stations 2, and allocates time slots to the broadcast transmission tower 1 in accordance with a predetermined schedule algorithm. Then, the time slots and/or frequency information allocated to the cellular base stations 2 and the time slot information allocated to the broadcast transmission tower 1 are notified to the resource notification unit 33.

Here, when the cellular base stations in a cell cluster are allocated with different frequencies or operate fixedly at different frequencies, the central control node allocates to each of the cellular base stations a fixed time slot equal to the entire time slot of the cell cluster. As to the broadcast transmission tower 1, however, the time slot has a fixed length, as shown in FIG. 5.

Further, when the cellular base stations in a cell cluster are divided into multiple groups each of which operates at the same frequency predetermined or allocated by the central control node, the central control node allocates time slots to the cellular base stations in each of the groups in a fixed or random way. The sum of time slots allocated to the cellular base stations in each of the groups equates to the entire time for the cell cluster. As to the broadcast transmission tower 1, however, the time slot has a fixed length, as shown in FIG. 6.

At step 102, the resource notification unit 33 notifies the resource control unit 25 in the corresponding cellular base stations of the time slots and/or frequency information allocated to each of the cellular base stations, notifies the time resource control unit 14 in the broadcast transmission tower 1 of the time slot information allocated to the broadcast transmission tower 1.

At step 104, during the time slot notified from resource notification unit 33, the time resource control unit 14 in the broadcast transmission tower 1 controls the RF unit 11 to transmit the video broadcast signals to the terminals, while the resource control unit 25 in each of the cellular base stations, during the time slot notified from resource notification unit 33, controls the RF unit to transmit and receive the signals to and from the terminals at the frequency predetermined or allocated by the central node.

As can be seen from the above method, the central control node 3 allocates corresponding resource to the broadcast transmission tower 1 and the cellular base stations 2 in accordance with a predetermined schedule algorithm so as to achieve the incorporation of the mobile communication networks and the video broadcast network. It will be understood that the central control node 3 can reallocate time slots in each frame or reallocate time slots at intervals of several frames depending on actual network requirement. In this case, the broadcast transmission tower 1 and the cellular base stations 2 perform communication based on currently newly-allocated resource. In addition, the cellular base stations 2 can remain in the sleeping state during the period without any resource allocated for the purpose of saving power.

In above-mentioned method, resource allocation is carried out only by the central control node itself, and this can produce certain effect in the case of a small number of terminals or a small flow of data stream. When there are a larger number of terminals or a large flow of data stream, the central control node needs to adopt an adaptive allocation manner for resource allocation so as to make a timely and accurate schedule.

In order to realize an adaptive schedule, it is necessary to establish a feedback mechanism between the cellular base stations 2 and the central control node 3. The central control node 3 allocates the resource to the cellular base stations 2 based on the information feedback by the cellular base stations 2. In this case, some corresponding improvements are required for the cellular base stations 2 and the central control node 3 to perform the adaptive schedule.

Figure 11:
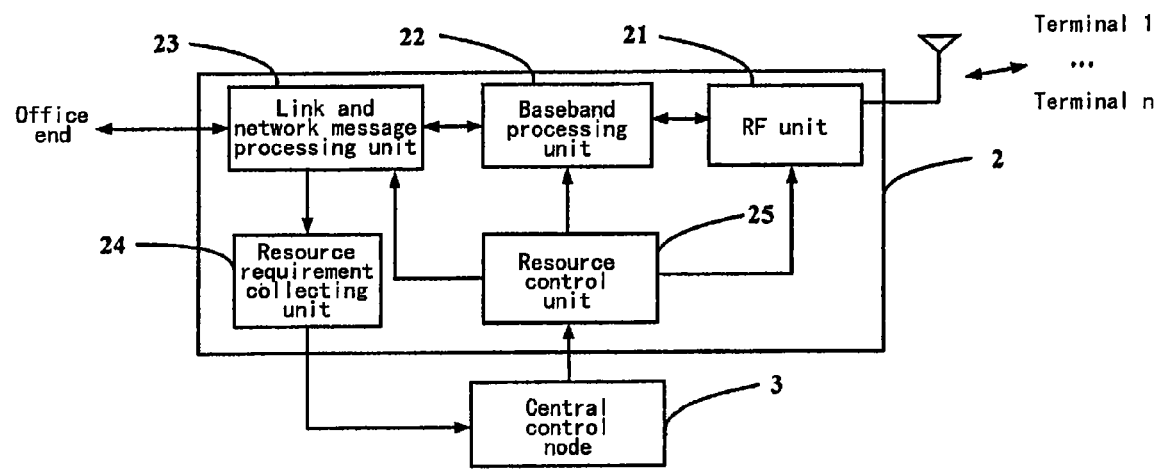
FIG. 11 is a schematic diagram showing another structural example of the cellular base station according to the embodiment of the present invention.

FIG. 11 is a structural schematic diagram showing a modified example of the cellular base stations 2 in the present embodiment. Each of the cellular base stations 2 comprises at least a radio frequency (RF) unit 21, a baseband processing unit 22, a link and network message processing unit 23, a resource requirement collecting unit 24 and a resource control unit 25.

The resource requirement collecting unit 24 collects current flow of upstream and downstream and the number of users, and then sends this statistical result to the central control node 3. The central control node 3 allocates resource (including time slots and/or frequency) to each of the cellular base stations 2 based on the statistical result sent from the corresponding resource requirement collecting unit 24. Other units have the same structures and functions as those previously mentioned and the description thereof will not be repeated here.

Specifically, on one hand, during the time slots allocated by the central control node 3, the signals sent by the terminals are first converted into baseband signals by the RF unit 21 (which operates at the frequency allocated by the central control node and/or the predetermined frequency). Thereafter, the baseband processing unit 22 decodes and demodulates the converted baseband signals and supplies them to the link and network message processing unit 23, which in turn checks and unpacks the decoded and demodulated signals and then sends the resultant signals to the office end. Meanwhile, the resource requirement collecting unit 24 collects the flow of upstream and downstream and the number of users for each of the cellular base stations and then sends this statistical result to the central control node 3. On the other hand, the message transmitted from the office end is packetized by the link and network message processing unit 23 into data packets, which are sent to as well as encoded and modulated by the baseband processing unit 22. After that, the RF unit 21 converts the encoded and modulated packets into wireless RF signals to be transmitted to the terminals. The RF unit 21 also receives signals from the terminals at the allocated or predetermined frequency.

Compared with the cellular base station shown in FIG. 8, The cellular base stations in the modified example shown in FIG. 11 each further includes a resource requirement collecting unit 24. The resource requirement collecting unit 24 collects the flow of upstream and downstream and the number of users for each of the cellular base stations and then sends this statistical result to the central control node 3 so as to obtain the basis for the resource allocation by the central control node 3. Then, the resource control unit 25 in each of the base stations receives the resource information allocated by the central control node 3, and controls the respective units in the base station to transmit and receive the signals to and from the terminal at the predetermined frequency or the frequency allocated by the central control node 3 during the allocated time slots, thereby achieving the time division multiplexing between the cellular base stations.

Figure 12:
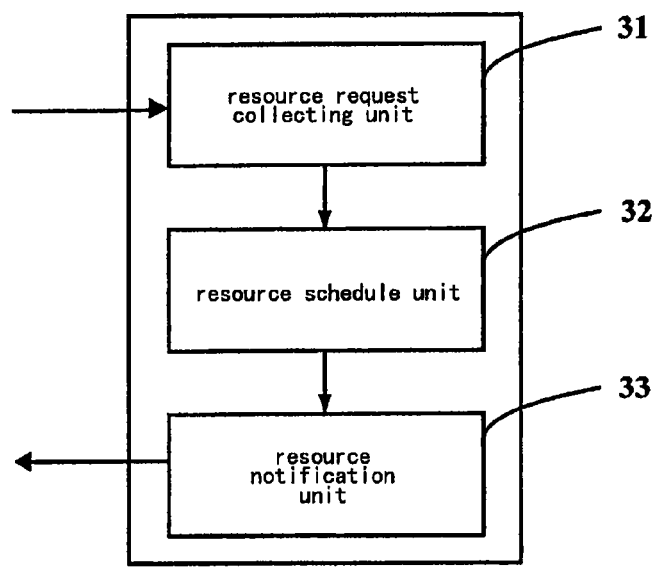
FIG. 12 is a schematic diagram showing another structural example of the central control node according to the embodiment of the present invention.

FIG. 12 is a structural schematic diagram showing the central control node 3 in a base station of the modified example of the present embodiment. The modified central control node 3 includes a resource request collecting unit 31, a resource schedule unit 32 and a resource notification unit 33.

The resource request collecting unit 31 collects the requests for resource sent from the respective cellular base stations 2. The resource schedule unit 32 allocates the resource (time slots and/or frequency) needed for signal transmission by the cellular base stations in each cell cluster in accordance with the statistical results for the cellular base stations in each cell cluster collected by the resource request collecting unit 31. The resource notification unit 33 notifies the broadcast transmission tower 1 of the time slot information allocated to it and also notifies each cellular base station of the resource information allocated to the corresponding cellular base station.

Here, the central control node 3 can be a device independent of all the cellular base stations and the broadcast transmission tower 1. The present invention is not limited thereto, however, the central control node 3 can be one of the processing units in the broadcast transmission tower or one of the processing units in a cellular base station.

Figure 13:
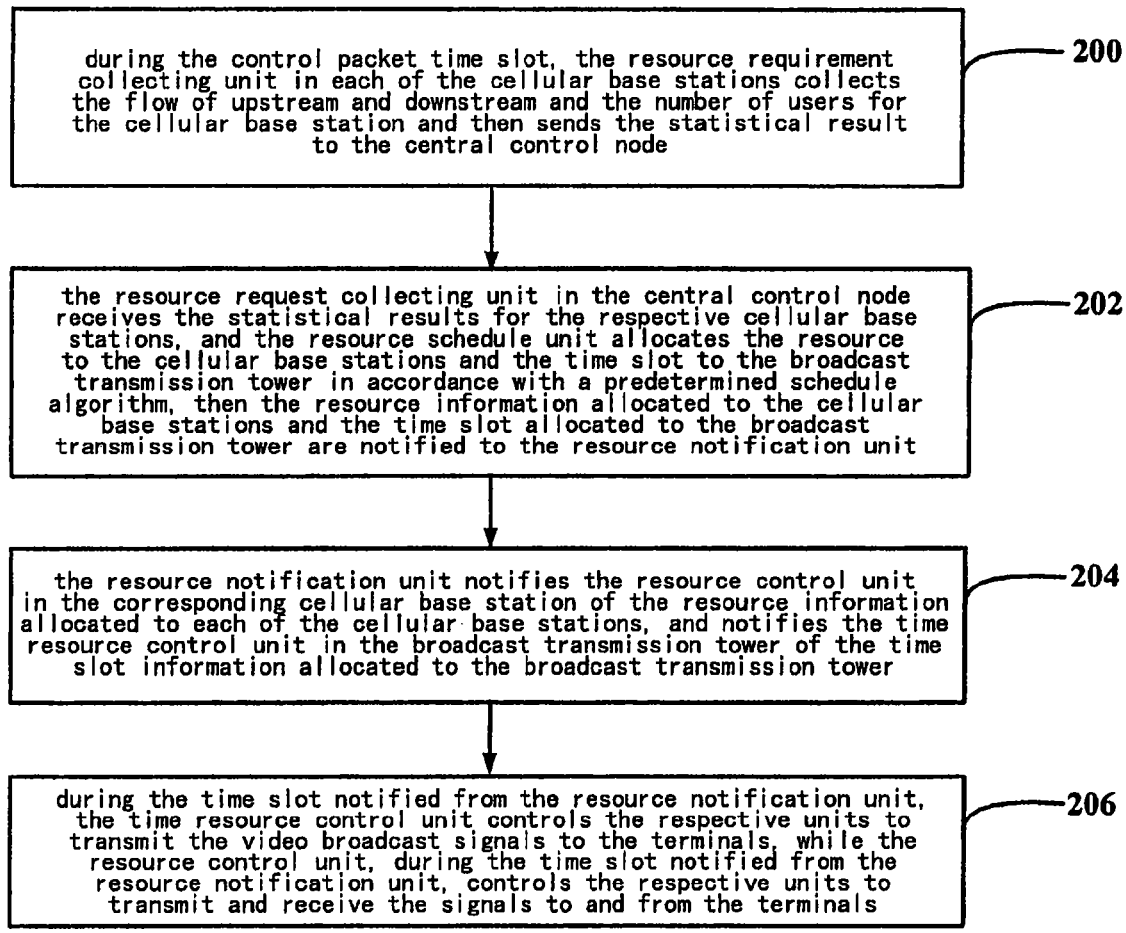
FIG. 13 is a flowchart of a communication method for the communication system incorporating mobile communication network and video broadcast network according to another embodiment of the present invention.

Next, the flow of the communication method for the modified example of the present embodiment will be described with reference to FIG. 13.

At step 200, during the control packet time slots, the resource requirement collecting unit 24 in each of the cellular base stations collects the flow of upstream and downstream and the number of users for the cellular base stations and then sends this statistical result to the central control node 3.

At step 202, the resource request collecting unit 31 in the central control node 3 receives the statistical results for the respective cellular base stations. The resource schedule unit 32 allocates the resource (including time slots and/or frequency) to the cellular base stations and allocates the time slots to the broadcast transmission tower in accordance with a predetermined schedule algorithm. Then, the information indicating the resource allocated to the cellular base stations and the time slots allocated to the broadcast transmission tower is sent to the resource notification unit 33. Herein, the predetermined algorithm may include various algorithms, such as round robin, PF, WFQ, WF$^2$Q, etc., which are known in the prior art and will not be described again.

After that, at step 204, the resource notification unit 33 notifies the resource control unit 25 in the corresponding cellular base station of the resource information allocated to the corresponding cellular base stations, and notifies the time resource control unit 14 in the broadcast transmission tower 1 of the time slot information allocated to the broadcast transmission tower 1.

Next, at step 206, during the time slots notified from the resource notification unit 33, the time resource control unit 14 controls the RF unit to transmit the video broadcast signals to the terminals, while the resource control unit 25, during the time slots notified from the resource notification unit 33, controls the corresponding unit to transmit and receive the signals to and from the terminals.

In the modified example, each of the cellular base stations 2 needs to apply to the central control node 3 for the resource (time slots and/or frequency) so as to decide the length of operating time and operating frequency during next frame. The cellular base station 2 may apply to the central control node 3 for the resource every frame or at intervals of several frames.

In this way, in the present embodiment, the mobile communication network and the video broadcast network are incorporated in the communication system by applying the corresponding resource to the broadcast transmission tower and the cell clusters in a time division multiplexing manner. The cellular base stations inside each cell cluster are further separated in the frequency and time domains. Therefore, the frequency and time resource can be fully utilized to realize the incorporation of the mobile communication network and the video broadcast network. Besides, each of the terminals and the cellular base stations can enter a sleeping state when the cellular base station isn't at its time slot for signal transmission. Therefore, the frequency resource occupied by any sleeping device can be released, so power is saved.

It should be noted that the time slot allocated to the broadcast transmission tower is generally fixed in the present embodiment and requires no reallocation by the central control node each time when video data is broadcast. Consequently, the broadcast transmission tower 1 doesn't have to apply to the central control node for time slot. If the time slot needed for the broadcast transmission tower 1 is variable, a resource requirement collecting unit may be provided as that in a cellular base station and submit the collected current data flow or the number of users to the central control node 3, which can allocate the time slot based on the data flow or the number of users.

Furthermore, after allocating resource to the broadcast transmission tower 1 and the cellular base stations, the central control node may broadcast the information indicating the allocated resource information to the broadcast transmission tower and the cellular base stations in a wired or wireless manner. The allocated time slot information can also be broadcast to the broadcast transmission tower, the cellular base stations and the terminals by means of wireless broadcast via, for example, some cellular base station or broadcast transmission tower in a cell cluster. In this way, the broadcast transmission tower, the cellular base stations and the terminals can have a clear recognition of the start and end points of the time slots obtain during next frame, and it is benefit to save power, especially the power of the terminals.

Only one broadcast transmission tower is exemplified to describe the present embodiment, and the present invention is not limited thereto. Since the contents transmitted from respective broadcast transmission towers are the same, and the number of cell clusters contained in the coverage of one broadcast transmission tower has no effect on the structure of a frame, the case of using multiple broadcast transmission tower is similar to that of using one broadcast transmission tower and hence description will not be omitted herein.

According to the communication system of the present embodiment, each cellular base station can adopt multiple access or duplex approach as required, for example, it can communicate with a terminal by way of FDD, TDD and TDMA/FDMA/CDMA.

According to the communication system of the embodiment, the mobile communication network and the video broadcast network can be incorporated, it can provide efficient video broadcast service while providing satisfied the mobile communication service. Time resource is allocated as required between the broadcast transmission tower and the cellular base stations so as to improve the use efficiency for frequent spectrum. The respective cellular base stations inside a cell cluster communicate with each other in a TDM and/or FDM manner, thereby making full use of frequency resource. Meanwhile, the central control node allocates time slots to each cellular base station based on the current flow of upstream and downstream as well as the number of users for the base station, so it is not necessary for the cellular base stations to perform complex control, such as cell breathing and the like. In addition, the terminals and the cellular base stations may significantly save the power thereof by making them stay at a sleeping state during the time slot not belonging to them.

So far, the present invention has been described in connection to the preferred embodiments. It will be appreciated for those skilled in the art that various change, substitution and addition can be made in the spirit and scope of the present invention. Therefore, the scope of the present invention should not be construed to be restrained by the above specific embodiments, and it should be defined by appended claims.

What is claimed is:

1. A communication system comprising:
a plurality of base stations which constitutes at least one cell cluster and through which a plurality of mobile terminals perform wireless communication;
A broadcast transmission tower, which is distinct from the plurality of base stations, for broadcasting video programs directly to the plurality of mobile terminals; and
a central control node for alternatively allocating time slots between the broadcast transmission tower and the plurality of base stations based on a predetermined schedule algorithm,
wherein the broadcast transmission tower broadcasts video programs to the plurality of mobile terminals within the time slots allocated to the broadcast transmission tower, and the plurality of base stations perform wireless communication with the plurality of mobile terminals within the time slots allocated to the plurality of base stations,
wherein the time slots allocated to the broadcast transmission tower do not overlap with the time slots allocated to the plurality of base stations, and
wherein the central control node also allocates frequency to the plurality of base stations for performing wireless communication with the plurality of mobile terminals.

2. The communication system according to claim 1, wherein all of the base stations in each cell cluster are divided into multiple groups each of which operates at different frequencies, the time slots allocated by the central control node to each of the groups are equal to the time slots for the cell cluster to which the group belongs, and the sum of the time slots allocated to the base stations in each of the groups is equal to the time slot for the cell cluster.

3. The communication system according to claim 1, wherein each of the base stations in each cell cluster operates at different frequencies, and the time slots allocated by the central control node to each of the base stations is equal to the time slot for the cell cluster to which the base station belongs.

4. The communication system according to claim 1, wherein each of said base station further comprises:
a resource control unit for receiving the time slots and/or frequency allocated by the central control node and controlling the base station to communicate with the mobile terminals at the predetermined frequency or frequency allocated by the central control node during the allocated time slots for wireless communication.

5. The communication system according to claim 1, wherein the broadcast transmission tower comprises a time resource control unit for receiving information indicating the allocated time slots for video program broadcast and controlling the broadcast transmission tower to broadcast video programs to the mobile terminals during the allocated time slots for video program broadcast.

6. The communication system according to claim 1, wherein the central control node further comprises:
a resource schedule unit for allocating the time slots to the broadcast transmission tower and allocating the time slots and/or frequency to each of the base stations; and
a resource notification unit for notifying the broadcast transmission tower of the allocated time slots for video program broadcast and notifying each of the base stations of the allocated time slots for wireless communication and/or frequency allocated to corresponding base stations.

7. The communication system according to claim 6, wherein each of said base stations further comprises:
a resource requirement collecting unit for collecting current data flow of upstream and downstream as well as the number of users in the base stations and sending the collection results to the central control node; and
the central control node further comprises:
a resource request collecting unit for collecting the collection results from the resource requirement collecting units in all of the base stations and sending the collection results to the resource schedule unit for resource scheduling based on said collection results.

8. The communication system according to claim 1, wherein said central control node is provided separated from the broadcast transmission tower and the base stations, or provided in the broadcast transmission tower or one of the base stations.

9. A method for performing video program broadcast and wireless communication in a communication system comprising a plurality of base stations which constitutes at least one cell cluster and through which a plurality of mobile terminals perform wireless communication, and a broadcast transmission tower, which is distinct from the plurality of base stations, for broadcasting video programs directly to the plurality of mobile terminals, said method comprising the steps of:

Alternatively allocating, by a central control node time slots between the broadcast transmission tower and the plurality of base stations based on a predetermined schedule algorithm;

Broadcasting, by the broadcast transmission tower video programs directly to said plurality of mobile terminals within the time slots allocated to the broadcast transmission tower, and the plurality of base stations performing wireless communications with the plurality of mobile terminals within the time slots allocated to the plurality of base stations, wherein the time slots allocated to the broadcast transmission tower do not overlap with the time slots allocated to the plurality of base stations, and wherein the central control node also allocates frequency to the plurality of base stations for performing wireless communication with the plurality of mobile terminals.

10. The method according to claim 9, wherein all of the base stations in each cell cluster are divided into multiple groups each of which operates at different frequencies, the time slots allocated by the central control node to each of the groups are equal to the time slots for the cell cluster to which the group belongs, and the sum of time slots allocated to the base stations in each of the groups is equal to the time slot for the cell cluster.

11. The method according to claim 9, wherein each of the base stations in each cell cluster operates at different frequencies, and the time slots allocated by the central control node to each of the base stations are equal to the time slots for the cell cluster to which the base station belongs.

12. The method according to claim 9, wherein the step of allocating time slots further comprises:

each of the base stations collecting current data flow of upstream and downstream as well as the number of users; and the central control node allocating the time slots for video program broadcast to the broadcast transmission tower based on the predetermined schedule algorithm and allocating the time slots for wireless communication and/or frequency to said base stations in each of the cell clusters based on the collection results of the respective base stations and the predetermined schedule algorithm, and then notifying the broadcast transmission tower of the allocated time slots for video program broadcast and notifying each of the base stations of the allocated time for wireless communication and/or frequency allocated to corresponding base stations.

13. The method according to claim 12, wherein said predetermined schedule algorithm comprises round robin, PF, WFQ and $WF^2Q$.

14. The method according to claim 9, wherein the central control node notifies the broadcast transmission tower of the time slots allocated for video program broadcast as well as notifies each of the base stations of the time slots allocated for wireless communication and/or frequency allocated to corresponding base station in a wired or wireless manner.

* * * * *